United States Patent [19]

Parker

[11] Patent Number: 5,357,603
[45] Date of Patent: Oct. 18, 1994

[54] METHOD AND SYSTEM FOR CHANGING A SHAPE TYPE WHILE MAINTAINING EXISTING GRAPHIC CHARACTERISTICS

[75] Inventor: David C. Parker, Menlo Park, Calif.

[73] Assignee: Microsoft Corporation, Redmond, Wash.

[21] Appl. No.: 898,792

[22] Filed: Jun. 15, 1992

[51] Int. Cl.$^5$ ............................................... G06F 3/14
[52] U.S. Cl. ................................................... 395/156
[58] Field of Search ............... 395/133, 141, 150, 161, 395/155, 156, 159, 157, 162, 133; 340/732, 734

[56] References Cited

U.S. PATENT DOCUMENTS

| | | | |
|---|---|---|---|
| 4,912,657 | 3/1990 | Saxton et al. | 364/518 |
| 5,030,945 | 7/1991 | Yeomans | 340/724 |
| 5,208,909 | 5/1993 | Corona et al. | 395/155 |

OTHER PUBLICATIONS

Deneba Software, "Using the Object Specs Command," Canvas 3.0 pp. 13–18 and 13–19, 1991.

*Primary Examiner*—Phu K. Nguyen
*Attorney, Agent, or Firm*—Seed and Berry

[57] ABSTRACT

A computer method and system for changing a shape type of a graphic data object. A first shape type is obtained through user selection and a graphic data object is created having graphic characteristics as predefined and/or as designated by the user. When so desired by the user, a second shape type is obtained through user selection. The graphic data object is then modified to have the second shape type while maintaining the other graphic characteristics. In a preferred embodiment, the first and second shape types are selected via a mouse through which the user positions the cursor on a shape type menu. To initially define the appearance of the graphic data object having the first shape type, graphic characteristics are obtained from the user, including color, fill pattern, border and size. The shape type of the graphic data object can be changed by re-selecting a new shape type from the shape type menu. The graphic data object is then redefined and displayed having the new shape type and maintaining the other graphic characteristics as originally selected.

20 Claims, 5 Drawing Sheets

METHOD AND SYSTEM FOR CHANGING A SHAPE TYPE WHILE MAINTAINING EXISTING GRAPHIC CHARACTERISTICS

TECHNICAL FIELD

The present invention relates generally to the field of computer graphics and, more specifically, to a method and means for changing a shape type of a graphic data object while maintaining other graphic characteristics of the graphic data object.

BACKGROUND OF THE INVENTION

Computer systems are currently available which provide users with various computer graphics capabilities. For example, with these systems, users can create shapes in the form of graphic data objects by operating various user input devices. Such devices include a mouse, a pen, or any other functionally equivalent positioning device.

In many of these computer systems, shapes are created and drawn on a display as a result of user selection of a shape type from a number of predefined shape types provided. Upon selection of the desired shape type, the user operates the user input device to select the location, vertices, etc. to create the shape desired.

In some such computer graphics systems, the user can designate various graphic characteristics such as a fill pattern, color, border, attached text, size, etc., for a created shape. By so designating these graphic characteristics, the user is able to create highly descriptive shapes, where desired.

It is sometimes desirable, however, for the user to change the shape type of an object without changing the other graphic characteristics already designated for that object. For example, as shown in FIG. 1, the user can initially choose a triangle from a display 100, by operating a user positioning device to position a cursor on a shape type menu 102, within the triangle selection box 104. The triangle can then be sized and positioned by specifying defining points, such as vertices, of the triangle.

Upon choosing the triangle, the user can designate graphic characteristics of the triangle, such as, color, border, attached text, size, etc. In FIG. 2, an example of the result of such a designation is illustrated. In this example, the graphic data object displayed is a triangle 200, which corresponds to user selection of a solid, red fill pattern 202, a white border 204 and white attached text 206, spelling "STOP."

Upon creation of such a graphic data object, the user may decide that, although the other graphic characteristics selected are acceptable, the graphic data object could be improved by having a different shape type. For example, upon reflection, it may occur to the user that, even though the red color, white border and attached text are much to be desired, the triangle 200 would be more appropriately represented as an octagon.

Conventionally, however, it has not been possible to obtain such a shape type change without completely recreating the graphic data object. That is, to provide an octagon having all other graphic characteristics possessed by the triangle 200, a user would have to first select an octagon shape type, and then again designate each of the graphic characteristics desired, this time for the new octagon shape type selected. However, to resort to such a largely repetitive action is relatively time-consuming in light of the fact that all other of the desired graphic characteristics have already been designated.

Thus, it is desirable to provide a method and means of changing the shape type of a graphic data object without changing other graphic characteristics of the graphic data object.

SUMMARY OF THE INVENTION

An object of the present invention is to provide a method and system for changing a shape type of an existing graphic data object.

Another object of the present invention is to provide such a method and system for changing the shape type while maintaining existing graphic characteristics of the graphic data object.

A more specific object of the present invention is to provide such a method and system for changing the shape type while maintaining other graphic characteristics, such as a fill pattern, color, border, attached text, position and size of the graphic data object.

These and other objects, which will become apparent as the invention is more fully described below, are obtained by providing a method and system for changing a shape type of a graphic data object while maintaining other graphic characteristics. A first shape type is initially obtained from a user selection of the first shape type. Other graphic characteristics are also obtained from the user for the first shape type. A second shape type is then obtained from the user. A graphic data object is then drawn having the second shape type, but having the graphic characteristics designated for the first shape type.

In an embodiment of the present invention, the user selection of the shape type is performed via a mouse by positioning the cursor at the desired location on a shape type menu. Graphic characteristics selected by the user for the graphic data object having the first shape type include color, fill pattern, border and size selected by the user, and these graphic characteristics become graphic characteristics of the graphic data object having the second shape type selected.

DETAILED DESCRIPTION OF THE INVENTION

Figure 1:
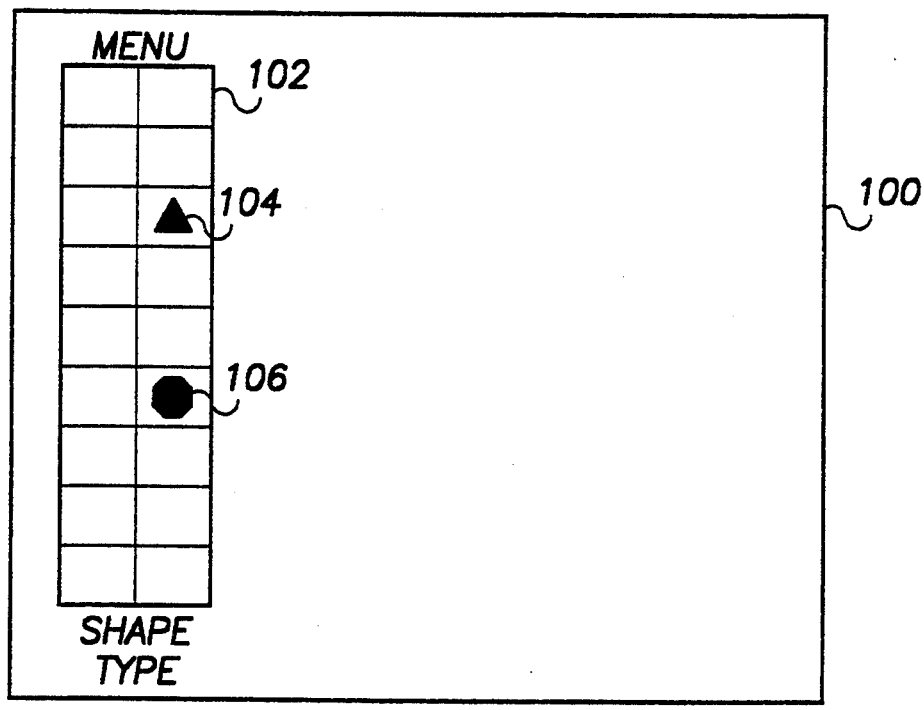
FIG. 1 is a diagram of a shape type menu, as displayed on the display, conventionally used to obtain a shape type from the user.
Figure 2:
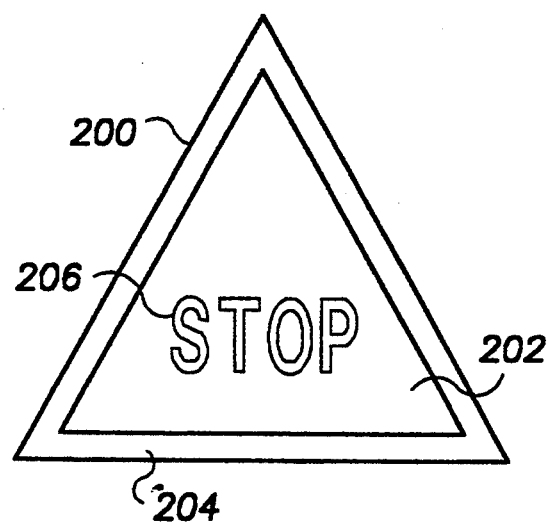
FIG. 2 is an illustration of a shape based on a graphic data object defined by the user.
Figure 3:
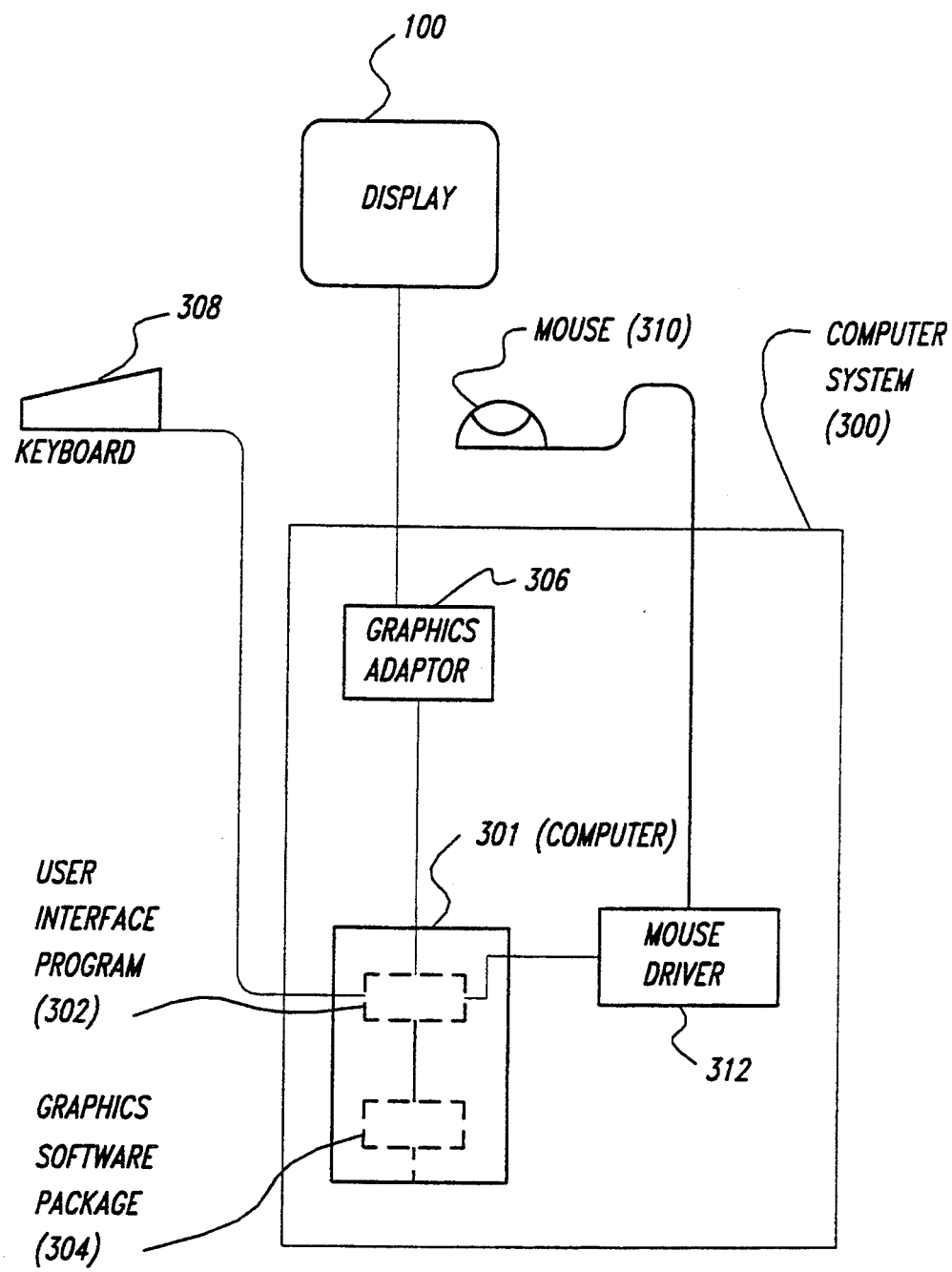
FIG. 3 is a block diagram of a computer system in which the present invention is implemented.

The present invention provides a method and system for changing a shape type of a graphic data object. In a preferred embodiment, the present invention displays a shape type menu from which the user can select a shape type. Upon selection of this shape type, the user can designate vertices or boundaries of a shape to be displayed, by virtue of specifying a bounding rectangle for the shape by dragging the mouse to define the bounding rectangle. As a result, the present invention creates a graphic data object and displays the desired shape based on the graphic data object.

The graphic data object on which the displayed shape is based is defined by a number of parameters. As explained above, some of the parameters, such as the shape type, location and original size are defined by the user during initial creation of the data object. Other parameters, such as color and fill pattern, include graphic characteristics initially given default values and kept available for modification by the user. Thus, shape type is just one of many user-selectable parameters that define a graphic data object.

In accordance with the present invention, after defining a graphic data object by selecting a shape type and setting a number of these parameters, a user can change the previously selected shape type to a new shape type, while maintaining the other graphic characteristics as currently defined. The preferred embodiment of the present invention provides this capability by providing a computer program which interfaces with the user to allow selection of a new shape type from the shape type menu. Upon this re-selection, the present invention draws a graphic data object having all of the previously selected graphic characteristics and having the re-selected shape type.

In a preferred embodiment of the present invention, a computer system 300 is connected to the display 100. The computer system 300 includes a computer 301, such as an IBM PC. The computer 301 has a conventional CPU, etc., and a memory in which user interface program 302 resides. The user interface program 302 interfaces with the user and display 100 to allow the user to perform graphic operations. The user interface program 302 is connected within the computer 301 to a conventional graphics software package 304. The graphics software package 304 contains graphic software for performing conventional operations. These conventional operations include plotting points, drawing lines between points, etc.

The user interface program 302 is also connected to the display 100 through a conventional graphics adapter 306, to a keyboard 308, and to a mouse 310 via a conventional mouse driver 312. The user interface program 302 receives user input through the mouse 310 and keyboard 308, and utilizes the conventional graphic software package 304 as necessary to perform graphic operations requested through this user input. Such operations include the changing of shape types in accordance with the present invention, as will be described.

Figure 4:
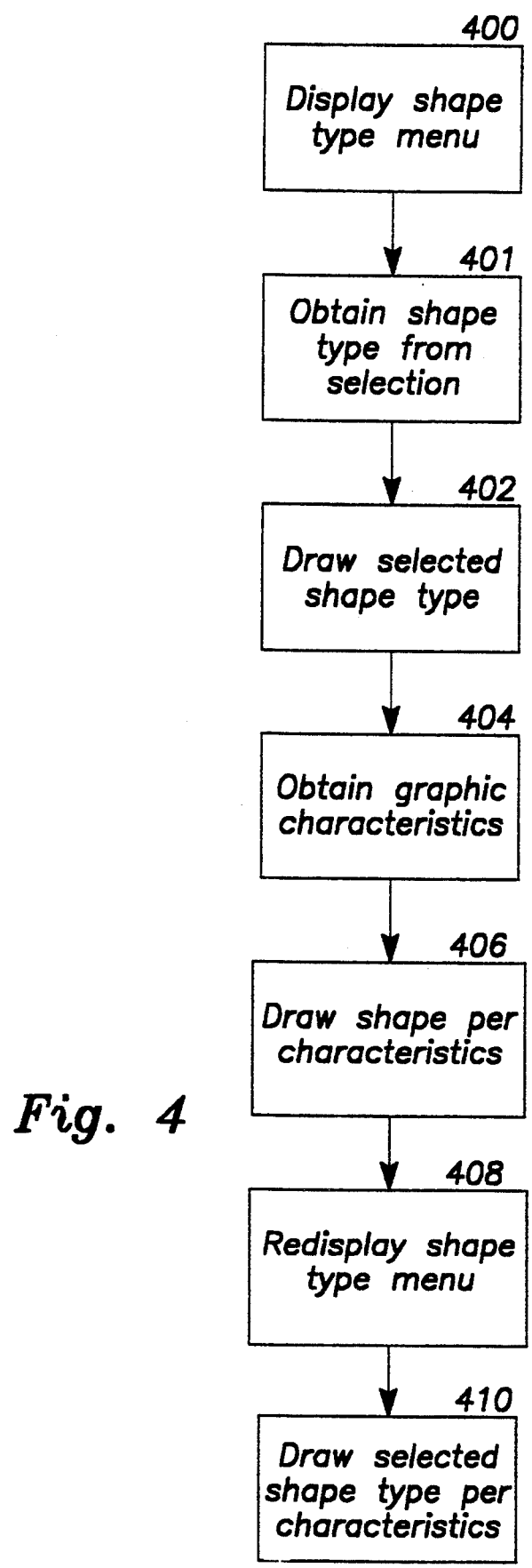
FIG. 4 is a flowchart of an example execution of the user interface computer program which interfaces with the user to draw and manipulate a shape in the present invention.
Figure 10:
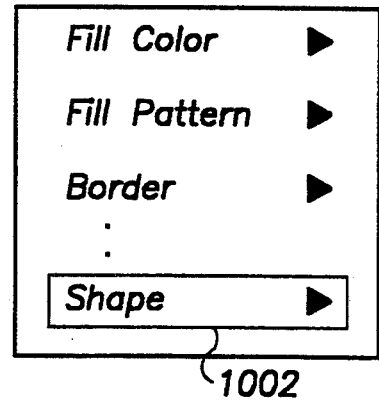
FIG. 10 is a diagram of a shape type menu, as displayed on the display, for user selection of a shape type in accordance with the present invention.
Figure 10:
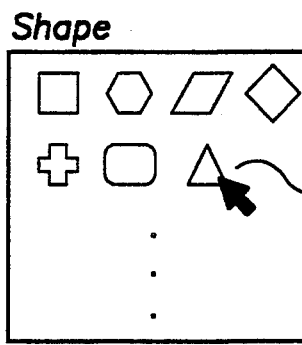

FIG. 4 is a flow chart of an example execution sequence of the computer program in the user interface program 302 that performs the shape type changing process in accordance with the present invention. In step 400, a shape type menu is displayed, such as the shape type menu 1000 in FIG. 10. The user specifies shape type selection by clicking the mouse on the shape box 1002. In step 401, the shape type is obtained from the user's selection. The user specifies a desired shape type on the shape type menu 1004 which is displayed as a result of clicking the mouse on the shape box 1002. This is done by, for example, positioning the cursor at a desired location on the shape type menu through control of the mouse. For example, a triangle shape type can be selected by clicking the cursor on the triangle 1006.

Figure 9:
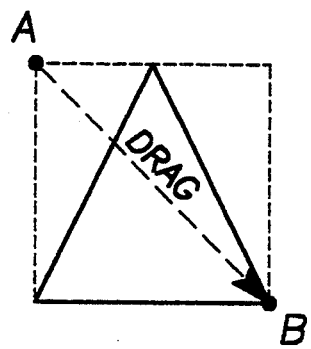
FIG. 9 is an example of designation of the vertices of a graphic data object by user specification of a bounding rectangle.

In step 402, the shape is drawn in accordance with the shape type selected and further in accordance with defining points designated by the user. The user selects defining points which define vertices of the shape by specifying a bounding rectangle for the shape by dragging the mouse. For example, the user drags the mouse from point A to point B to define the location and size of a triangle, as shown in FIG. 9. The present invention then draws the shape based on the shape type selected and the defining points designated. The computer program accomplishes this by calling a general subprogram for drawing shapes, based on the shape type and other specified parameters, such as position, size, color, fill pattern, border, etc. For those parameters not selected by the user, default values are initially sent, such that the subprogram obtains all necessary data to initially draw the shape.

For example, if the triangle shape type is selected, initially only defining points A and B and the shape type are specified, so all other parameters are sent as default values, as shown in the following pseudocode representation:

| | |
|---|---|
| Call DrawShape | (Triangle-type, A, B, Default Color, Default Fill Pattern, Default Border, Empty Text) |

Figure 5:
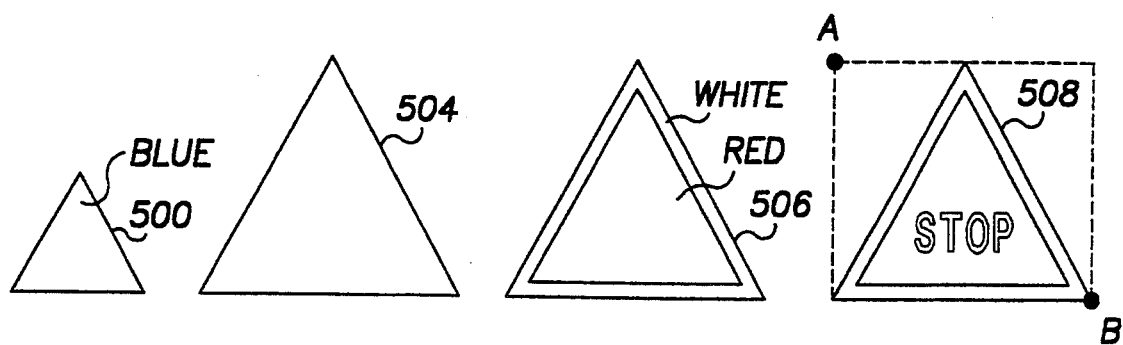
FIG. 5 is a series of illustrations of a shape based on a graphic data object initially selected and progressively redefined by the user.

As shown in FIG. 5, a triangle 500 is drawn when defaults as shown above are selected as follows: the color is blue, the fill pattern is solid, the border is none, and the text is empty. This color designation could alternatively include border color and text color as well as fill pattern color, and one of ordinary skill in the art would recognize many equivalent methods of sending such graphic characteristics.

In step 404, graphic characteristics are obtained from the user as desired. For example, the user can resize the triangle as triangle 504, change the color to red and border to white, as in triangle 506, and add the text "STOP" as in triangle 508. The changes can be entered by the user through known methods of setting graphic data parameters.

For example, the user can call up menus listing colors, fill patterns, borders, etc., and designate the desired characteristics by positioning the cursor at desired locations on these menus and then clicking the mouse.

Text additions can also be requested from a menu, and the attached text can be entered via the keyboard.

Figure 6A:
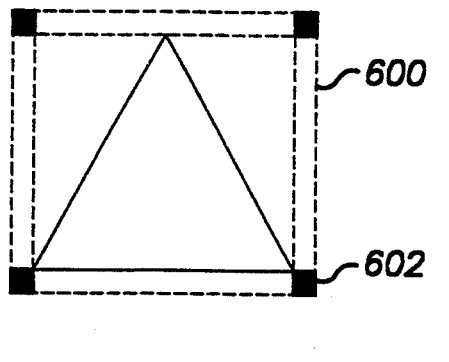
FIGS. 6A and 6B are illustrations of a shape resized by the user.
Figure 6B:
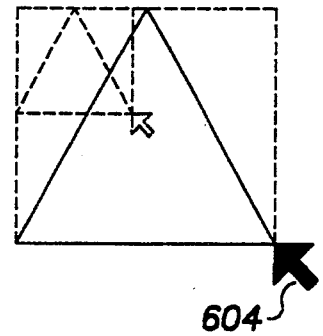

Graphic data objects can be resized, as shown in FIGS. 6A and 6B. This is accomplished by first providing the user with move bars 600 about the rectangular bounds of the shape, as shown in FIG. 6A. The user can then reduce or enlarge the shape by moving four resize handles 602 provided at the corners of the move bars 600, by dragging the cursor 604, while positioned at one of these resize handle 602 to a desired new position, as shown in FIG. 6B. The new size of the object, as designated by the resize, is defined by the new rectangular bounds of the shape, as indicated by the new position of the move bars 600.

In step 406, the shape is redrawn per the originally selected shape type and the newly designated graphic characteristics. This is accomplished in the computer program in the present invention by calling the DrawShape subprogram and sending parameters representing the newly designated graphic characteristics. For example, the subprogram is called as follows:

| Call DrawShape | (Triangle-type, A, B, Red, Solid, White, "STOP") |
|---|---|

The above subprogram, when executed, would thus cause the triangle 508 to be drawn.

In step 408, the shape type menu is again displayed, upon an indication that the user wishes to change the shape type while maintaining other existing graphic characteristics in the graphic data object. This indication could be made through any known method, such as the selection from a menu of available shapes, such as the shape menu 1004, as was displayed for selection of the original shape type. Upon display of the shape type menu, the user can select a new shape type, such as the octagon 106 in the shape type menu 102.

In step 410, the present invention erases the object having the original shape, and redraws the object having the new shape type, and otherwise having the same, originally set or designated graphic characteristics. The computer program in the present invention performs this operation by calling the subprogram for drawing shapes, and by sending the same parameters sent to the subprogram to draw the originally selected shape type, except for the shape type parameter, which receives the newly selected shape type. For example, the subprogram would be called to draw an octagon as follows:

| Call DrawShape | (Octagon-type, A, B, Red, White, "STOP") |
|---|---|

Figure 7:
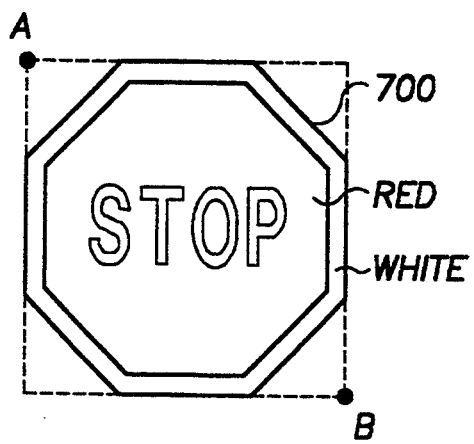
FIG. 7 is an illustration of a shape based on a graphic data object having a new shape type defined by the user, and maintaining other graphic characteristics or previously defined.
Figure 8:
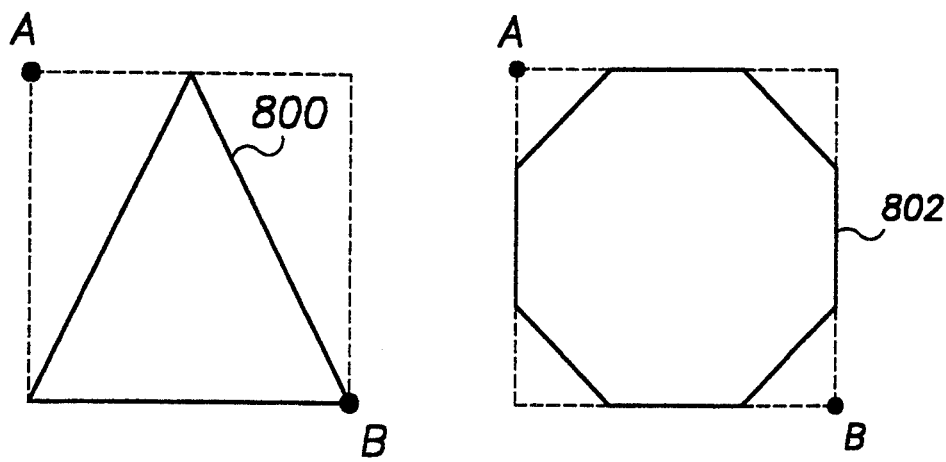
FIG. 8 is an illustration of shapes drawn by the present invention.

As a result, an octagon is drawn, as shown in FIG. 7. The octagon 700 has all of the graphic characteristics of the triangle 508, except for having the octagon shape type. Specifically, the octagon 700 has the same red solid color and solid fill pattern, white border and text. Also, the relative size of the octagon corresponds to the size of the originally defined triangle, as defined by the defining points A and B, indicating corners of the bounding rectangle which bounds the graphic data object. The text is repositioned relative to the bounding rectangle of the object, as indicated by an inscribed rectangle within the graphic data object.

The DrawShape program draws desired shapes based on known computer graphics techniques and mathematical relationships. The shape, fill pattern, color, and border are sent as parameters to the DrawShape program. For example, the subprogram might be declared in pseudo-code as:

| Call DrawShape | (Shape-type, Point A, Point B, FillColor, FillPattern, BorderStyle, Text) |
|---|---|

The provision of fill patterns, colors and borders to shapes is well known in the computer graphics field. Implementation of the shapes is described below.

The geometry portion of the DrawShape subroutine is implemented by consulting a table of data that specifies the pre-computed (x,y) coordinates of the points for each of the allowable shape types, specified with respect to a standard bounding rectangle. For example, using a rectangle defined by (0,0) at its lower-left and (100,100) at its upper-right as the standard bounding rectangle, point A would be (0,100) and point B would be (100,0). The triangle and octagon would thus be defined as follows:

Triangle: 3 points: {(0,0), (50,100), (100,0)}
Octagon: 8 points: {(0,29), (0,71), (29,100), (71,100), (100,71), (100,29), (71,0), (29,0)}(note: 29 approximates $100/(2+\sqrt{2})$ and $71 = 100 - 29$).

When a shape is drawn at a position specified by an actual drawing rectangle (as specified by the point A and point B parameters to DrawShape), the position of each actual point (x', y') is computed based on the corresponding reference point (x,y) from the above table as follows:

bottom = min(Ay,By)
top = max (Ay,By)
left = min (Ax,Bx)
right = max (Ax,Bx)
height = top − bottom
width = right − left
x' = x * width/100 + left
y' = y * height/100 + bottom As should be clear from the above description, the present invention provides a computer method and system for changing a shape type of a graphic data object without changing other existing graphic characteristics of that graphic data object.

Although the present invention has been described in terms of the above preferred embodiment, the invention itself is not limited to the embodiment described. Implementations and modifications within the spirit of the invention will be apparent to those of ordinary skill in the art. For example, numerous kinds of shape types can be provided in addition to those disclosed and these shape types can be switched, while maintaining other existing graphic characteristics, in accordance with the general concept of the present invention, as described above. The scope of the invention itself is defined in the following claims.

I claim:

1. A method performed by a computer of changing a polygon type of a graphic data object, comprising the steps of:
    (a) obtaining a first polygon type for the graphic data object in response to a first user selection, the first polygon type being a rectangle with four sides;
    (b) obtaining graphic characteristics for the graphic data object having the first polygon type in response to a second user selection;
    (c) obtaining a second polygon type for the graphic data object in response to a third user selection, the second polygon type having a number sides that is different than the number of sides of the first polygon type; and (d) drawing the graphic data object having the second polygon type, and having the graphic characteristics selected by the second user selection for the first polygon type.

2. A method according to claim 1 wherein the step (b) includes obtaining a bounding rectangle indicating a position and size of the graphic data object.

3. A method according to claim 1 wherein the step (b) includes attaching text to the graphic data object which remains attached when the second polygon type is obtained.

4. A method according to claim 3 wherein step the (d) includes repositioning the attached text as necessary to correspond to the second polygon type.

5. A method according to claim 4 wherein the repositioning step includes maintaining the text within a boundary corresponding to an inscribed rectangle within the graphic data object.

6. A method according to claim 1 wherein the step (b) includes obtaining a fill pattern.

7. A method according to claim 1 wherein the step (b) includes obtaining a color designation.

8. A method according to claim 1 wherein the step (b) includes obtaining a border style of the graphic data object.

9. A method performed by a computer with a display, of changing a shape type of a graphic data object, comprising the steps of:

(a) displaying a shape type menu on the display;

(b) associating a first shape type with the graphic data object, the first shape type being selected by a user from the shape type menu;

(c) obtaining graphic characteristics for the graphic data object;

(d) attaching text to the graphic data object;

(e) drawing on the display the graphic data object having the selected first shape type, the graphic characteristics obtained, and the attached text;

(f) displaying the shape type menu on the display;

(g) associating a second shape type with the graphic data object, the second shape type being selected by a user from the shape type menu; and (h) redrawing on the display the graphic data object having the selected second shape type and maintaining the graphic characteristics obtained and the attached text.

10. A method according to claim 9 wherein the step (c) includes obtaining a bounding rectangle indicating a position and size of the graphic data object.

11. A method according to claim 9 wherein the step (c) includes repositioning the attached text as necessary to correspond to the second shape type.

12. A method according to claim 11 wherein the repositioning step includes maintaining the attached text within a boundary corresponding to an inscribed rectangle within the graphic data object.

13. A computer system for changing a polygon type of a graphic data object, comprising the steps of:

means for obtaining a first polygon type in response to a first user selection, the first polygon type being a rectangle with four sides;

means for obtaining graphic characteristics for the graphic data object having the first polygon type in response to a second user selection;

means for obtaining a second polygon type in response to third user selection, the second polygon type having a number of sides that is different than the number of sides of the first polygon type; and means for drawing the graphic data object having the second polygon type, but having the graphic characteristics according to the second user selection for the first polygon type.

14. A computer system according to claim 13 wherein the means for obtaining graphic characteristics for the first polygon type includes means for obtaining a bounding rectangle indicating the size of the graphic data object.

15. A computer system according to claim 13 wherein the means for obtaining graphic characteristics includes means for obtaining attached text associated with the graphic data object.

16. A computer system according to claim 15 wherein the means for drawing the graphic data object includes means for repositioning the attached text as necessary to correspond to the second polygon type.

17. A computer system according to claim 16 wherein the means for repositioning the attached text includes means for maintaining the text within a boundary corresponding to an inscribed rectangle within the graphic data object.

18. A computer system according to claim 13 wherein the means for obtaining graphic characteristics includes means for obtaining a fill pattern.

19. A computer system according to claim 13 wherein the means for obtaining graphic characteristics includes means for obtaining a color designation.

20. A computer system according to claim 13 wherein the means for obtaining graphic characteristics includes means for obtaining a border style of the graphic data object.

* * * * *